United States Patent Office 3,459,686
Patented Aug. 5, 1969

3,459,686
AZIRIDINE COPOLYMERS
Clarence R. Dick, Lake Jackson, Tex., assignor to The Dow Chemical Company, Midland, Mich., a corporation of Delaware
No Drawing. Filed June 6, 1966, Ser. No. 555,255
Int. Cl. C08g *33/08*
U.S. Cl. 260—2.1                                          4 Claims

ABSTRACT OF THE DISCLOSURE

A resinous polymeric composition suitable for use as an ion exchange material which comprises a minor proportion of a 1,1' - (phenylenediethylene)bisaziridine (PDBA) moieties and a major proportion of an N-alkyl-, N-alkaryl-, N-aralkyl- or N-aryl-substituted aziridine, such as phenethyl aziridine moieties. The composition preferably consists of from 1 to 10 percent by weight PDBA, and remainder of the N-substituted aziridine.

---

The present invention relates to novel polymeric compositions prepared from N-substituted aziridines and to a process for preparing them. More particularly, it relates to copolymers comprising a minor amount of a 1,1'-(phenylenediethylene)bisaziridine and a major amount of an N-alkyl-, N-aryl-, N-aralkyl-, or N-alkaryl-substituted aziridine. The novel copolymers of the present invention have a demonstrated utility as ion-exchange materials.

Polymers of some N-substituted aziridines are known in the art. For example, U.S. Patent 2,626,931, issued Jan. 27, 1953, discloses resinous polymeric products obtained by polymerizing ester-, ketone-, or nitrile- substituted aziridines with neutral sulfuric and sulfonic acid ester catalysts. Self-polymers of such N-substituted aziridines as phenethyl aziridine are also known in the art. These self-polymers are soluble in most organic solvents and in aqueous acids.

It has now been discovered that novel polymeric compositions which are insoluble in most organic solvents and in aqueous acids and bases may be prepared by an addition reaction involving a minor amount of a 1,1'-(phenylenediethylene)bisaziridine isomeric mixture (hereinafter PDBA) and a major amount of certain N-alkyl, N-aryl-, N-aralkyl-, or N-alkaryl-substituted aziridines, as set forth below (hereinafter N-substituted aziridines). The novel polymeric compositions of the present invention contain, in combined form, from about 0.2 to about 20 percent by weight, polymer basis, of a PDBA and from about 80 to about 99.8 percent by weight of the N-substituted aziridine. They are prepared by digesting a mixture of the indicated proportions of PDBA and N-substituted aziridine with an acid polymerization catalyst in water solution at a temperature between about 5° C. and about 100° C. for a time sufficient to precipitate a copolymeric product. In a preferred embodiment, the novel polymeric compositions of this invention contain, in combined form, from about 1 to about 10 percent by weight of the PDBA and from about 90 to about 99 percent by weight of the N-substituted aziridine.

Methods for preparing N-substituted aziridines suitable for the practice of this invention are known in the art. For example, phenethyl aziridine may be prepared by reacting ethylenimine and styrene in the presence of a sodium catalyst according to the procedure described by H. Bestian, Annalen, 566, 210 (1950). Similarly, PDBA's may be prepared by reacting an alkylenimine, such as ethylenimine or propylenimine and divinylbenzene according to the same procedure. Other N-substituted aziridines suitable for preparing the novel copolymers of this invention include ethylphenyl aziridine, butyl aziridine, phenyl aziridine, and the like. Methods for preparing these and similar N-substituted aziridines are also described by Bestian. Preferably, the group substituted on the nitrogen atom of the aziridine ring should contains from 1 to about 12 carbon atoms.

In general, any organic, inorganic or Lewis acid polymerization catalyst is suitable for the preparation of the novel polymers of the present invention. Examples of suitable acid polymerization catalysts include mineral acids, such as hydrochloric acid, hydrobromic acid, sulfuric acid, and the like; organic acids, such as acetic acid, p-toluene sulfonic acid, trichloracetic acid, trifluoroacetic acid and the like; Lewis acids, such as aluminum trichloride, and the like. The preferred acid catalyst is sulfuric acid.

The amount of the catalyst used may be from about 0.1 percent by weight to about 20 percent by weight or higher, total monomers basis. An amount of the catalyst sufficient to produce polymerization under the conditions specified herein is all that is required (hereinafter a catalytic amount). In general, about 0.2 weight percent, total monomers basis, has been found most useful for polymerization within practical time periods.

In practice, the copolymers of this invention are prepared by dissolving the PDBA and the N-substituted aziridine in water. The aqueous solution resulting is cooled to about 0° C. and a catalytic amount of the acid polymerization catalyst is added. The mixture is warmed, and polymerization starts at about 5° C., beginning precipitation of the copolymer. The mixture may be heated up to abuot 100° C. and digested further to insure completion of the copolymerization. Essentially complete conversion of the monomers used takes place under these conditions.

The following examples describe completely representative specific embodiments and the best modes contemplated by the inventors for practicing the claimed invention. The invention is limited only by the scope of the claims appended hereto.

EXAMPLE 1

Into a reaction vessel equipped with means for stirring and temperature control is placed 50 g. of phenethyl aziridine, 10 g. of PDBA, and 300 ml. water. The temperature is maintained at 0° C., and 2 ml. of 25 percent by weight aqueous sulfuric acid is added to induce polymerization. The temperature of the resulting mixture is elevated to 50° C. and maintained there for four hours. A white precipitate is formed, which is removed from the reaction medium by filtration, washed with distilled water, and dried in a vacuum oven. The product chars at 250° C., does not melt at 300° C. and has an ion-exchange capacity of 2.8 milliequivalents per gram, dry basis. It is insoluble in aqueous mineral acids and bases. Substitution of ethylphenyl aziridine and butyl aziridine for phenethyl aziridine in the above procedure gives a similar insoluble resinous precipitate suitable for use as an ion-exchange resin. Substitution of another PDBA, e.g., the reaction product of propylenimine and divinylbenzene, gives similar advantageous results.

EXAMPLE 2

A copolymer is prepared according to the procedure of Example 1 from 5 g. of PDBA and 50 g. of phenethyl aziridine. The product has the same physical characteristics as that of Example 1 and has an ion-exchange capacity of 2.2 milliequivalents per gram. Substitution of phenyl aziridine for phenethyl aziridine in the above procedure gives a similar insoluble precipitate suitable for use as an ion exchange resin.

Copolymers prepared from 0.05 g. of PDBA and 50 g. of phenethyl aziridine and from 0.08 g. of PDBA and 50 g. of phenethyl aziridine are soluble in aqueous acids and bases. Substitution of other acidic polymerization catalysts as described above in the procedure of Examples 1 and 2 gives similar copolymeric products.

What is claimed is:

1. A resinous polymeric composition comprising, in combined form, from about 0.2 to about 20 percent by weight of a 1,1'-(phenylenediethylene)bisaziridine isomeric mixture and from about 80 to about 99.8 percent by weight of an N-alkyl-, N-alkaryl-, N-aralkyl-, or N-aryl-substituted aziridine.

2. A resinous polymeric composition as in claim 1 containing from about 1 to about 10 percent by weight of a 1,1'-(phenylenediethylene)bisaziridine.

3. A resinous polymeric composition as in claim 1 wherein the N-substituted aziridine is phenethyl aziridine, ethylphenyl aziridine, butyl aziridine, or phenyl aziridine.

4. A resinous polymeric composition as in claim 1 wherein the N-substituted aziridine is phenethyl aziridine.

References Cited

UNITED STATES PATENTS

| 2,626,931 | 1/1953 | Bestian | 260—2 |
| 3,355,437 | 11/1967 | Tesoro et al. | 260—2 |

FOREIGN PATENTS

| 957,308 | 8/1949 | France. |
| 976,570 | 11/1964 | Great Britain. |

OTHER REFERENCES

Manecke et al.: "Berichte der Deutschen Chemischen Gesellschaft," vol. 95 (1962), pp. 2700–2707.

SAMUEL H. BLECH, Primary Examiner

U.S. Cl. X.R.

260—2, 239